United States Patent Office 2,702,410
Patented Feb. 22, 1955

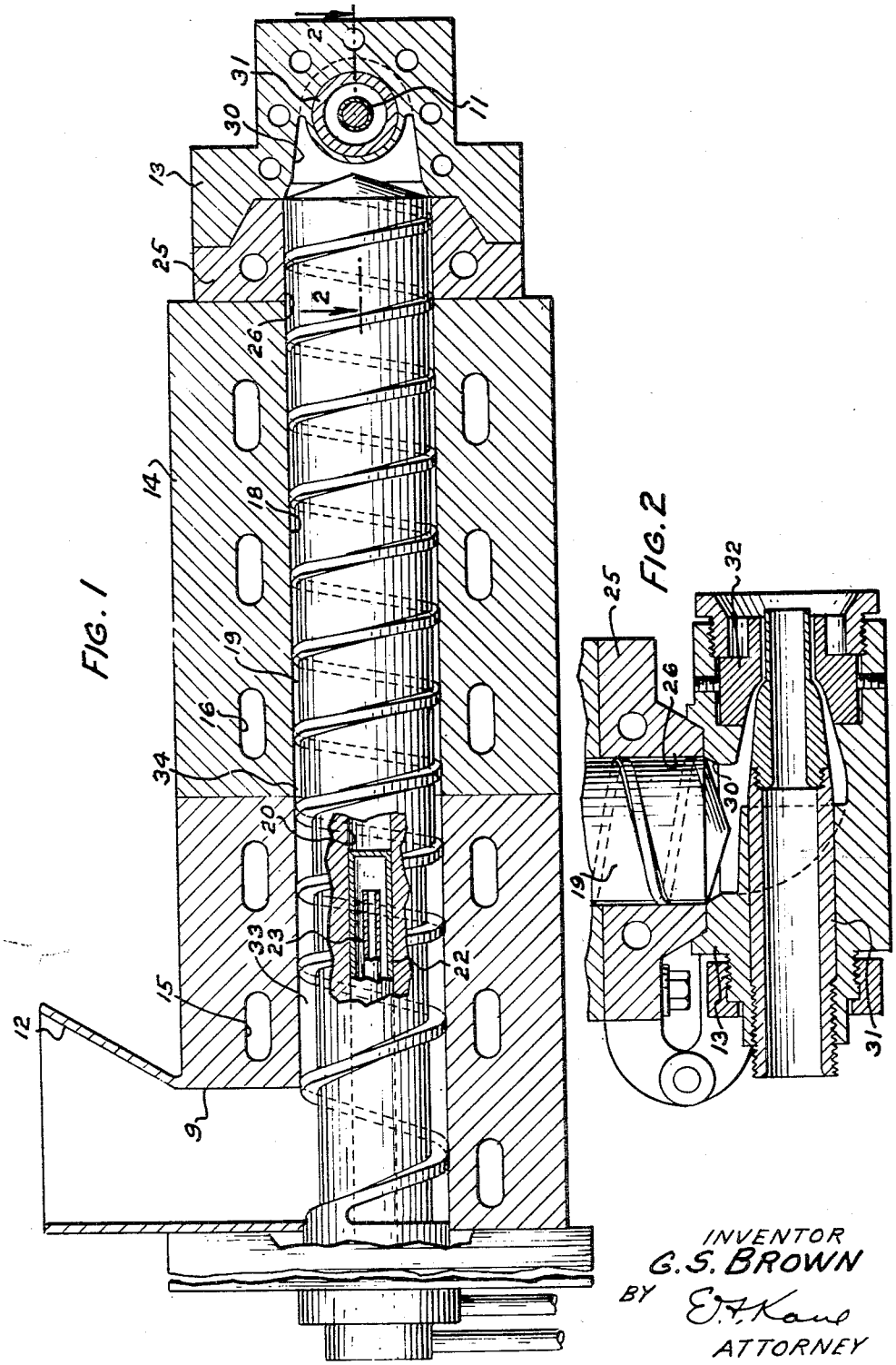

2,702,410

METHOD OF WORKING AND EXTRUDING PLASTIC COMPOUNDS

Grant S. Brown, Downers Grove, Ill., assignor to Western Electric Company, Incorporated, New York, N. Y., a corporation of New York Application June 21, 1951, Serial No. 232,824

8 Claims. (Cl. 18—48)

This invention relates to methods of working and extruding plastic compounds into article form, and more particularly to methods of and apparatus for simultaneously forcing thermoplastic compounds through extrusion apparatus and plasticizing them.

Thermoplastic compounds frequently are employed to insulate or protect conductors or cable cores. Among the thermoplastic compounds used for this purpose are polyethylene, polymerized vinyl chloride, copolymers of vinyl chloride and vinyl acetate, and the like. The thermoplastic compounds are usually fed into an extruder in powder form or in the form of small granules, and are heated to a plastic state partially by heat applied to the extruder through circulating fluids. It is essential that such compounds be subjected to considerable working to mix them thoroughly, compact the granules and express air entrapped in the granules. In the past it has been difficult to express air entrapped in the granules, particularly with large extrusion machines of the size commonly used to form jackets on conductive cores, such as, for example, cable cores.

An object of the invention is to provide new and improved methods of simultaneously working and extruding plastic compounds.

A further object of the invention is to provide new and improved methods of simultaneously forcing plastic compounds through extrusion apparatus and expressing air from the compounds prior to extrusion thereof.

A method illustrating certain features of the invention may include advancing a plastic compound continuously along a predetermined path having a predetermined length, and abruptly compacting the material at a point in the path such that air trapped in the material up to that point may work back along the path. The material is heated as it is moved along the path and is fused at the point of compression thereof so that all air entrapped in the compound is fed back along the granular portion of the compound being fed along the path.

An apparatus illustrating certain features of the invention may include an extrusion cylinder having therein an imperforate bore of a predetermined diameter and also having a material receiving portion and a delivery end portion spaced substantially therefrom, and a stock screw mounted rotatably in the bore for forcing granular thermoplastic compound from the receiving portion of the cylinder to the delivery end portion thereof. The stock screw is provided with a groove which varies from deep to shallow from the receiving portion toward the delivery end of the bore at a point therealong such that air entrapped in the material may be fed back to the receiving portion of the cylinder as the compound is compressed, and remains relatively shallow for the remainder of the length of the screw.

A complete understanding of the invention may be obtained from the following detailed description of a method and an apparatus forming specific embodiments thereof, when read in conjunction with the appended drawing, in which Fig. 1 is a vertical section of an apparatus forming one embodiment of the invention, and Fig. 2 is a fragmentary, horizontal section taken along line 2—2 of Fig. 1.

Methods and apparatus embodying the invention may be used to apply coverings of plastic compounds upon materials of indefinite length, such as wire-like conductors and cable cores used for communication purposes, and form imperforate, uniform coverings completely free of air and gas bubbles.

Referring now in detail to the drawing, a granular thermoplastic material is fed into a hopper 12 of an extrusion cylinder 14, and is formed into a covering over a cable core 11 advanced continuously through an extrusion head 13. The cylinder has an opening 9 therein through which the material flows into the cylinder. The extrusion cylinder 14 also is provided with heat-exchange passages 15 and 16 through which heated oil or steam may be supplied to heat the portions of the cylinder coextensive therewith, and also is provided with a smooth-surfaced, imperforate, cylindrical bore 18, in which is mounted a stock screw 19 having a bore 20 therein. A cooling tube 22 extends into the bore 20 about a third of the length of the threaded portion of the stock screw, and a supply pipe 23 supplies cold water to the cooling tube 22 so that the portion of the stock screw coextensive with the cooling tube is cooled thereby. Certain features of the cooling tube and the elements associated therewith are disclosed and claimed in my copending application Serial No. 232,825, filed June 21, 1951, for "Apparatus for Advancing and Working Plastic Compounds."

An adapter 25 having a bore 26 therein forms an extension of the extrusion cylinder 14. The extrusion head 13 includes a passage 30 communicating with the bore 18 in the extrusion cylinder, and a core tube 31 and a die 32 are mounted in the extrusion head. As the cable core 11 is advanced through the core tube 31 and the die 32, they form the thermoplastic compound into a covering around the core. The stock screw is provided with a groove 33, which is deep from the lefthand end of the extruding cylinder 14 to a very short transition or compacting portion 34 in which the groove becomes relatively shallow. The portion 34 must be located at a point nor farther than one-half the length of the threaded portion from the lefthand end of the screw, and preferably is located at a point about a third of the way along the length of the threaded portion of the screw from the lefthand end thereof. The groove remains shallow throughout the remainder of the screw to the right of the compacting portion, and preferably becomes even more shallow gradually from the compacting portion to the delivery end of the screw to create a back pressure on the compound to keep the portion of the groove back to and including the compacting portion under pressure and filled completely with compound. The compacting portion occupies about one-half a revolution of the groove.

*Operation*

Thermoplastic material, such as polyethylene, polymerized vinyl chloride, a copolymer of vinyl chloride and vinyl acetate, or the like, in granular or powder form with suitable fillers and/or pigments, is introduced into the hopper 12 of the extruding cylinder 14. The stock screw 19 is continuously turned in the direction such as to force the thermoplastic material from left to right as viewed in Fig. 1. As the material is forced along the stock screw and the extrusion cylinder, the heated oil in the passage 15 heats the porous or cellular exterior portions of the granular thermoplastic material to a soft condition fusible under pressure as the material reaches the compacting portion 34 of the groove 33. At this point only the exterior portions of the granules, which portions contain substantially all the gases entrapped in the granules, are quite soft. The cold water circulated through the cooling tube 22 keeps the portion of the stock screw substantially up to that point cool to maintain high the mixing and delivery efficiencies of this portion of the screw, and this portion of the stock screw efficiently mixes and delivers the thermoplastic material. The material is sharply compacted as it is forced from the deep portion of the groove 33 through the compacting portion 34 of the groove, whereby air carried by the portion of the thermoplastic material to the left of the transition portion 34 is forced back along the screw 19 and escapes through the hopper 12 to the atmosphere.

The material forced past the compacting portion 34 through the groove 33 contains no trapped air and is heated and mixed further to a high extrudability at the point of extrusion. As the material travels from the compacting portion, it is heated by the cylinder 14 and the passage 16 having circulated therethrough a heated exchange liquid at a temperature of around 375° F. The material is rubbed around the cylinder in flat, shallow ribbon-like form so that as much surface as possible is presented to the heated cylinder wall and the compacted material softens further and is extruded in that condition. Thus, the material is brought to a condition of thorough thermal and physical homogeneity just before it is extruded through the die 32.

In one highly successful polyethylene extruding apparatus, the diameter of the stock screw and the bore 18 was 10 inches, the length of the threaded portion of the stock screw 19 was about 85 inches, the length of the deep portion of the groove 33 was about 36 inches, and the compacting portion 34 of the groove 33 was about one-half of one revolution of the groove. The length of the portion of the screw to the right of the compacting portion was about 56 inches, the depth of the deep portion of the groove was about three-quarters of an inch, the depth of the shallow portion of the screw at its juncture with the compacting portion was about one-quarter of an inch and the depth of the shallow portion of the groove at the delivery end of the screw was about one-eighth of an inch. The width of the groove 33 was about four and one-half inches from the point to the right of the hopper opening in the extrusion cylinder to the righthand end of the screw to the delivery end of the screw. The helix angle of the thread of the screw was about eighteen degrees, twenty-six minutes for the first revolution of the thread at the starting end, and then was about nine degrees throughout the rest of the screw. The length of the opening 9 was about ten inches. When this apparatus was successfully used to mix and extrude a granular polyethylene compound composed of about ninety-eight per cent polyethylene, about two per cent carbon black and a slight amount of a suitable antioxidant, the portion of the cylinder along the passage 15 was kept at a temperature under 300° F. and over 150° F. to heat the compound sufficiently that the compound was compacted completely in the compacting portion of the groove. The portion of the cylinder along the passage 16 was maintained at a temperature in the order of 375° F., at which temperature the compound was extruded into a solid, non-porous covering without bubbles therein.

The above-described method and apparatus serve to thoroughly mix plastic compounds prior, express air from the compound so that no bubbles are formed in the extruded products and heat the compounds to a highly extrudable condition.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. The method of working and extruding plastic compounds, which comprises advancing a plastic compound starting in a granular state continuously along a predetermined path having a predetermined length, abruptly compacting the material at a point in the path such that air entrapped in the compound up to that point may work back along the path, heating the material as it is moved along the path to a temperature at the point of compacting thereof just sufficiently high that it is substantially instantaneously fused as it is compacted so that all air carried with the compound is fed back along the granular portion of the compound being fed along the path, maintaining the material compacted along the remainder of the path from said point, and extruding the compound in article-form at the exit end of said path.

2. The method of working and extruding plastic material into article-form, which comprises advancing a plastic compound to a die along a path that is initially of a predetermined cross-sectional area and then changes abruptly to a cross-sectional area which is substantially less than that of the first-mentioned portion of the path, heating the compound as it is advanced along the first-mentioned portion of the path to soften it just sufficiently that it is consolidated substantially instantaneously as it is moved from the larger portion of the path to the smaller portion of the path, and heating the compound along the remainder of the path to raise the extrudability thereof.

3. The method of extruding granular thermoplastic compounds, which comprises advancing a granular thermoplastic compound along a softening zone under a predetermined compression, heating the compound as it is advanced along the softening zone to soften the compound to a condition at which the granules are fusible substantially instantaneously at the end of the softening zone upon abruptly increasing the compression of the compound, abruptly increasing the compression of the compound to a substantially higher value at the end of said zone, maintaining the last-mentioned compression on the compound, extruding the compound under such compression, and feeding gases released from the compound as it is placed under said last-mentioned compression back along the softening zone toward the entrance end thereof.

4. The method of working and extruding plastic compounds, which comprises advancing a plastic compound initially in a cold, granular condition continuously along a predetermined path having a predetermined length, abruptly compacting each increment of the compound at a point in the path such that air trapped in the compound up to that point may work back along the path, heating the compound as it approaches said point just sufficiently that it is substantially instantaneously fused as it is compacted at said point, and heating the compound further after it is compacted to make it highly extrudable.

5. The method of working and extruding plastic material into article-form, which comprises advancing a plastic compound along a path that is initially of a predetermined cross-sectional area and then changes abruptly to a cross-sectional area which is substantially less than that of the first-mentioned portion of the path, heating the compound as it is advanced along the first-mentioned portion of the path just to the extent necessary to soften it to a condition in which it is substantially instantaneously fused and compacted at said abrupt change but is not smoothly extrudable, heating the compound along the remainder of the path to a temperature at which it is smoothly extrudable, and extruding the compound in article-form.

6. The method of extruding granular thermoplastic compounds, which comprises advancing a granular thermoplastic compound along a softening zone having a predetermined length under a predetermined compression, heating the compound as it is advanced along the softening zone to soften the compound, whereby entrapped air may be released from the granules, abruptly increasing the compression of the compound to a substantially higher value at the end of said zone to substantially instantaneously fuse and compact the granules to force entrapped air out of the granules back along the softening zone, then advancing the compound along a mixing zone having a length at least twice that of the softening zone, maintaining the last-mentioned compression on the compound in the mixing zone, extruding the compound under such compression, and feeding trapped gases released from the compound as it is placed under compression at the start of the mixing zone back along the softening zone toward the entrance end thereof.

7. The method of working and extruding polyethylene compounds into article form, which comprises advancing polyethylene compounds along a path that is initially of a predetermined cross-sectional area and then changes abruptly to a cross-sectional area which is substantially less than that of the first-mentioned portion of the path, the length of said portion having a larger cross-section being about one-half that of the portion having the smaller cross-section, heating the compound as it is advanced along the first-mentioned portion of the path sufficiently to soften it to a compressible condition in which it is substantially instantaneously fused as it is abruptly compacted as the cross-sectional area abruptly decreases, heating the compound along the remainder of the path to raise the extrudability thereof, and extruding the compound.

8. The method of extruding granular polyethylene compounds, which comprises advancing a granular polyethylene compound along a softening zone under a predetermined compression, heating the compound as it is advanced along the softening zone to soften the compound to a condition in which it is not compacted by said compression and is compactable under a substantially higher compression, abruptly increasing the compression of the compound to a substantially higher value at the end of said zone to compact the compound substantially instantaneously to express gases therefrom, maintaining the last-mentioned compression on the compound, extruding the compound, and feeding the gases released from the compound as it is placed under said last-mentioned compression back along the softening zone toward the entrance end thereof.

References Cited in the file of this patent

UNITED STATES PATENTS

| | | |
|---|---|---|
| Re. 23,240 | Magerkurth et al. | June 13, 1950 |
| 2,369,553 | Fields | Feb. 13, 1945 |
| 2,519,014 | Bankey | Aug. 15, 1950 |
| 2,653,349 | Elgin et al. | Sept. 29, 1953 |